UNITED STATES PATENT OFFICE.

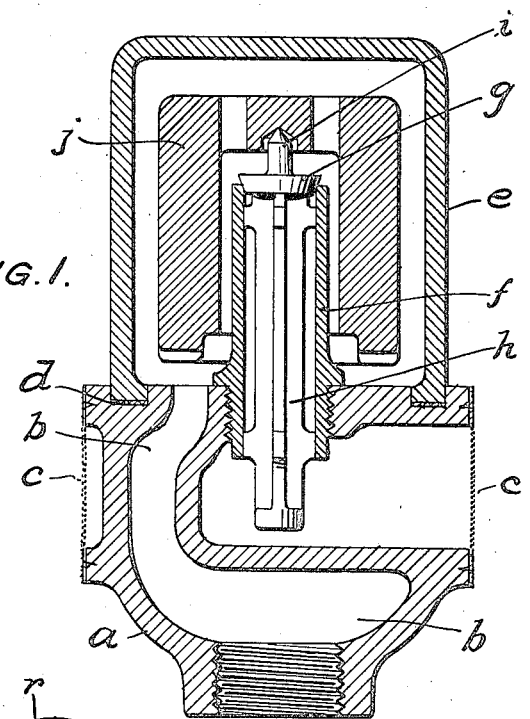
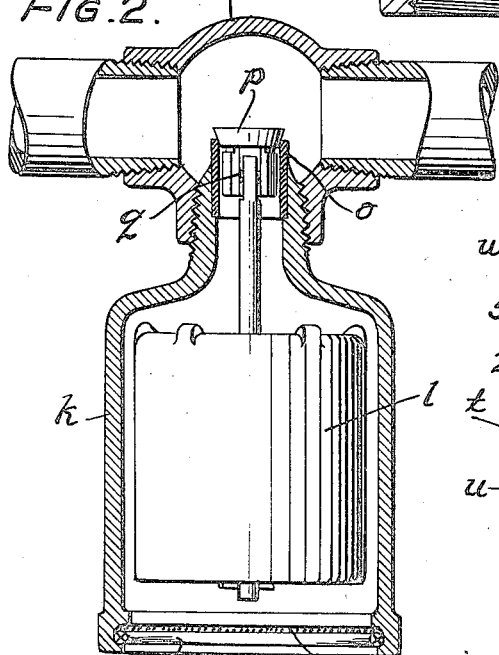
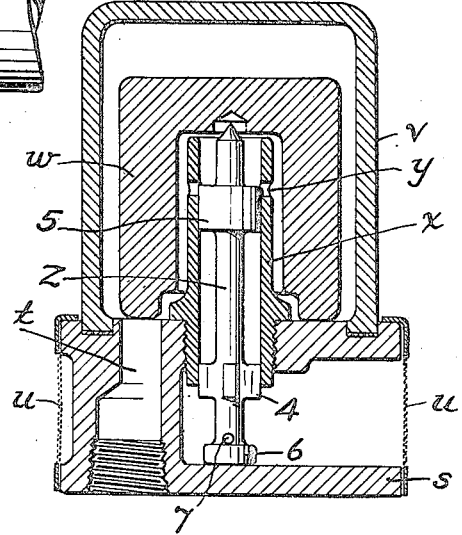

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

VACUUM-REGULATING APPARATUS.

1,420,035.  Specification of Letters Patent.  Patented June 20, 1922.

Application filed January 23, 1920. Serial No. 353,459.

*To all whom it may concern:*

Be it known that I, SELDEN H. HALL, a citizen of the United States, residing at Poughkeepsie, county of Dutchess, and State of New York, have invented a new and useful Improvement in Vacuum-Regulating Apparatus, of which the following is a full, clear, and exact description, reference being had to the accompanying drawings, which form a part of this specification.

My invention relates to valves for maintaining a uniform difference in pressure between two bodies of fluid. It is particularly adapted for maintaining a uniform degree of vacuum in the pipes of a cow milking outfit.

The object of my invention is to provide a valve that is simple, inexpensive, and not liable to get out of order or out of adjustment, with the adjustment of which it is not easy to tamper, and which will nevertheless operate so as to hold the difference in pressure between the atmosphere and the pipe system within close limits. Many types of valves having springs, suspended weights, diaphragms, soft seats, etc., have been tried, but have been found unsatisfactory because of complication, lack of uniformity in action, or ease of tampering with the adjustment.

In the accompanying drawings,—Fig. 1 is a vertical sectional view of one form of my valve; Fig. 2 is a similar view of a modification; and Fig. 3 a similar view of another modification.

Referring first to Fig. 1: $a$ is a base having a passage $b$ adapted for connection with the pipe or chamber in which it is desired to maintain a uniform vacuum. This base is preferably made in the form of two discs connected at one side of the center by the walls of the passage $b$. A cylindrical screen $c$ prevents the entrance of dirt to the space between the two discs.

Resting on a gasket $d$ on top of the base $a$ is a dome or cover $e$, with which the passage $b$ communicates. Supported by and extending upward from the upper disc is a valve guiding tube or cylinder $f$ opening at its lower end into the space between the discs and at its upper end into the space within the dome. The top of this tube forms the seat for a valve $g$ having a long, winged guide stem $h$ extending downward within the cylinder and an upwardly extending pointed stem $i$ on which rests a weight $j$ that hangs downward around the cylinder. The dome is of a minimum size to allow sufficient freedom of movement for the weight.

The operation is as follows: As air is exhausted from the chamber of the dome $e$, the pressure on the upper side of the valve $g$ is reduced until atmospheric pressure which has free access to the under side of the valve, is able to raise it and the attached weight. Air then passes through the valve into the dome chamber until the pressure rises (or the vacuum reduces) to that for which the valve is adjusted. The weight will then force the valve to its seat and stop the flow of air until the pressure difference is again great enough to lift the valve and weight.

Referring to Fig. 2: $k$ is a body of a minimum size to contain, with sufficient freedom of movement, a weight $l$. The lower end of the body is open except for a screen $m$ held in place by a wire ring $n$ snapped into a groove in the body. The upper end of the body is contracted and threaded to fit a standard pipe connection $r$ on the pipe or chamber in which it is desired to maintain a uniform vacuum. For economy I prefer to make the body of cast iron and into the contracted portion force a non-corrosive tube $o$ which guides the wings of, and forms a seat for the head of, a valve $p$ from which the weight $l$ is suspended. In order to prevent binding, if the device is not perfectly vertical, I provide at $q$ a flexible joint between the valve and the weight.

The operation of this embodiment of my invention is essentially the same as that of Fig. 1.

The construction shown in Fig. 3 is the same as that of Fig. 1 except that a piston valve is substituted for the valve $g$. The base $s$, passage $t$, screen $u$, dome or cover $v$ and weight $w$ correspond respectively to the parts $a$, $b$, $c$, $e$ and $j$ of Fig. 1. The tube or cylinder $x$ is similar to the tube or cylinder $f$ of Fig. 1 except that ports $y$ are formed a short distance below its top. Within the cylinder $x$ moves a valve member $z$ having, near its lower end, guiding wings 4 and near its upper end a piston 5. The extreme top of the valve member $z$ is pointed to fit in a socket formed in the controlling weight $w$, which hangs down around the outside of the valve cylinder x. The extreme lower end of the valve member has a button 6 above which a cross pin 7 is passed through the valve member.

When in operation, with the passage t connected to a vacuum pipe, the air is exhausted from inside of the dome and above the valve, as in the construction of Fig. 1. Atmospheric pressure entering the bottom of the cylinder x and passing up between the guiding wings e presses against the under side of the piston 5. When the difference in pressure is great enough, the valve member z and the weight w rise until the piston 5 uncovers the ports y and allows sufficient air to pass into the space within the dome and into the pipe connected therewith to reduce the difference in pressure to a value barely sufficient to support the valve member and weight. If the difference in pressure is less than that required to support the valve and weight, they will move downward and provide a wide lap of the valve below the ports so as to reduce leakage to a minimum.

The cross pin 7 prevents the valve moving too far in an upward direction.

By the term pressure fluid, as used in the claims, I mean to include the atmosphere or any fluid having a higher relative pressure than the absolute pressure corresponding to the degree of vacuum which it is desired to maintain in the system.

Having now fully described my invention, what I claim and desire to protect by Letters Patent is:

1. A sensitive vacuum controlling valve for milking machines comprising a casing having a chamber arranged to be connected to a pipe in which it is desired to maintain a partial vacuum, a second chamber in communication with the atmosphere, a tubular guide communicating with both chambers, a valve for closing communication through said tubular guide between the vacuum chamber and atmosphere, a stem on said valve, guiding projections on the stem for engaging the tubular guide, and a weight pivotally supported centrally of the valve stem and having its center of gravity below the valve.

2. A sensitive vacuum controlling valve for milking machines comprising a casing having a chamber arranged to be connected to a pipe in which it is desired to maintain a partial vacuum, a second chamber in communication with the atmosphere, a tubular guide communicating with both chambers, a valve for closing communication through said tubular guide between the vacuum chamber and atmosphere, a stem on said valve, guiding projections on the stem for engaging the tubular guide, and a weight suspended from the valve, there being a tapered point and socket connection between the weight and valve.

3. A sensitive vacuum controlling valve for milking machines comprising a base having a passage in communication with the atmosphere and a passage arranged to be connected to a pipe in which it is desired to maintain a partial vacuum, a cover mounted upon the base and in permanent communication with said vacuum passage, a tubular guide secured in fixed relation to the base and extending upward into the space enclosed by the cover, the tubular guide being in permanent, free and unrestricted communication with the atmosphere passage, a valve slidable relatively to the elements hereinbefore specified and adapted to govern communication between the interior of the tubular guide and the space enclosed by the surrounding cover, and a bell-shaped weight movable by the valve, the annular body of the weight extending downward into the annular space between the cover and the tubular valve guide.

In testimony of which invention, I have hereunto set my hand, at Poughkeepsie, N. Y., on this 16th day of January, 1920.

SELDEN H. HALL.